United States Patent
Ezrielev et al.

(10) Patent No.: US 12,505,213 B2
(45) Date of Patent: *Dec. 23, 2025

(54) CYBER RECOVERY FORENSICS KIT CONFIGURED TO MAINTAIN COMMUNICATION AND SEND RETURN MALWARE

(71) Applicant: Dell Products L.P., Round Rock, TX (US)

(72) Inventors: Ofir Ezrielev, Be'er Sheba (IL); Jehuda Shemer, Kfar Saba (IL); Amihai Savir, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 54 days.

This patent is subject to a terminal disclaimer.

(21) Appl. No.: 17/937,887

(22) Filed: Oct. 4, 2022

(65) Prior Publication Data

US 2024/0111866 A1   Apr. 4, 2024

(51) Int. Cl.
  *G06F 21/56* (2013.01)
  *G06F 21/55* (2013.01)
(52) U.S. Cl.
  CPC .......... *G06F 21/566* (2013.01); *G06F 21/554* (2013.01); *G06F 2221/033* (2013.01)
(58) Field of Classification Search
  CPC . G06F 21/566; G06F 21/554; G06F 2221/033
  See application file for complete search history.

(56) References Cited

U.S. PATENT DOCUMENTS

| | | |
|---|---|---|
| 5,398,196 A | 3/1995 | Chambers |
| 9,009,829 B2 | 4/2015 | Stolfo et al. |
| 10,169,585 B1 | 1/2019 | Pilipenko et al. |
| 10,878,084 B1 | 12/2020 | Voss et al. |
| 10,885,191 B1 | 1/2021 | Gupta |
| 2016/0080414 A1 | 3/2016 | Kolton et al. |
| 2016/0132351 A1 | 5/2016 | Kashyap et al. |
| 2017/0118241 A1 | 4/2017 | Call et al. |
| 2017/0237771 A1 | 8/2017 | Miroshnikov et al. |
| 2018/0114020 A1 | 4/2018 | Hirschberg et al. |
| 2018/0165451 A1 | 6/2018 | Kawakita |

(Continued)

FOREIGN PATENT DOCUMENTS

WO   2018/038718 A1   3/2018

OTHER PUBLICATIONS

Shahid; "Cybersecurity: Past, Present, and Future", Oct. 2, 2022.

(Continued)

*Primary Examiner* — Esther B. Henderson
(74) *Attorney, Agent, or Firm* — Workman Nydegger

(57) ABSTRACT

Data protection including malware response operations are disclosed. When a production system is attacked, the malware is allowed to run in a forensic environment in order to learn its operational characteristics. The forensic environment includes a working scenario that may be prepared in advance with false data that allows the malware to communicate with a malware host system. Once the operational characteristics are learned, a return malware can be placed in the data. The return malware is transmitted to a malware host system by the malware itself and executed.

20 Claims, 6 Drawing Sheets

(56) References Cited

U.S. PATENT DOCUMENTS

| | | | |
|---|---|---|---|
| 2018/0167403 A1* | 6/2018 | Smith | G06F 21/55 |
| 2020/0210575 A1 | 7/2020 | Huang et al. | |
| 2021/0067553 A1 | 3/2021 | Ries et al. | |
| 2021/0124826 A1 | 4/2021 | Matsuda et al. | |
| 2021/0157913 A1* | 5/2021 | Fralick | H04L 63/145 |
| 2021/0176257 A1* | 6/2021 | Yavo | H04L 63/02 |
| 2021/0209225 A1 | 7/2021 | Ghosh et al. | |
| 2021/0243226 A1 | 8/2021 | El et al. | |
| 2021/0336970 A1 | 10/2021 | Woo | |
| 2021/0349748 A1 | 11/2021 | Dunfey et al. | |
| 2022/0100855 A1 | 3/2022 | Kumar et al. | |
| 2022/0398315 A1 | 12/2022 | Young et al. | |
| 2023/0009355 A1* | 1/2023 | Challener | H04L 9/14 |
| 2023/0239323 A1 | 7/2023 | Seletskiy et al. | |
| 2023/0254331 A1* | 8/2023 | Wright | H04L 63/1483 |
| | | | 726/22 |
| 2023/0396646 A1 | 12/2023 | Wang et al. | |
| 2024/0086525 A1 | 3/2024 | Orazio et al. | |
| 2024/0111865 A1 | 4/2024 | Ezrielev et al. | |
| 2024/0111867 A1 | 4/2024 | Ezrielev et al. | |
| 2024/0126879 A1 | 4/2024 | Ezrielev et al. | |

OTHER PUBLICATIONS

Buecker, et al; "IBM Security Solutions Architecture for Network, Server and Endpoint", Feb. 2011.

Alhaidari et al. "ZeVigilante: Detecting Zero-Day Malware Using Machine Learning and Sandboxing Analysis Techniques" (Year: 2022).

* cited by examiner

CYBER RECOVERY FORENSICS KIT CONFIGURED TO MAINTAIN COMMUNICATION AND SEND RETURN MALWARE

FIELD OF THE INVENTION

Embodiments of the present invention generally relate to a computing forensics system or a forensics kit. More particularly, at least some embodiments of the invention relate to systems, hardware, software, computer-readable media, and methods for protecting data from malware and other cyber threats.

BACKGROUND

Most entities rely on applications and data for operational purposes. Hospitals, for example, have applications that require/use/generate data related to patients, medicines, procedures, and the like. Much of this data is confidential. Airlines rely on applications and data to manage flights, passengers, employees, and more.

These entities exert substantial efforts to ensure that their data is available when needed. These efforts include generating backups of the production systems/data. Generating backups helps ensure that in the event of data loss, the production systems can be restored, and operations can resume.

Data corruption or loss, however, can occur in different ways. The loss of a disk drive due to hardware failure, for example, can be quickly resolved. The loss of data (e.g., inability to access the data) due to malware or other cyber threats can be much more problematic.

Malware that infects a production system, for instance, can cause severe problems in the entity's operations. In addition to infecting production systems, malware may also infect backups. Recovering from malware can be complicated and difficult. Further, the delay associated with recovering the production system may be further increased when law enforcement or insurance companies are involved.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
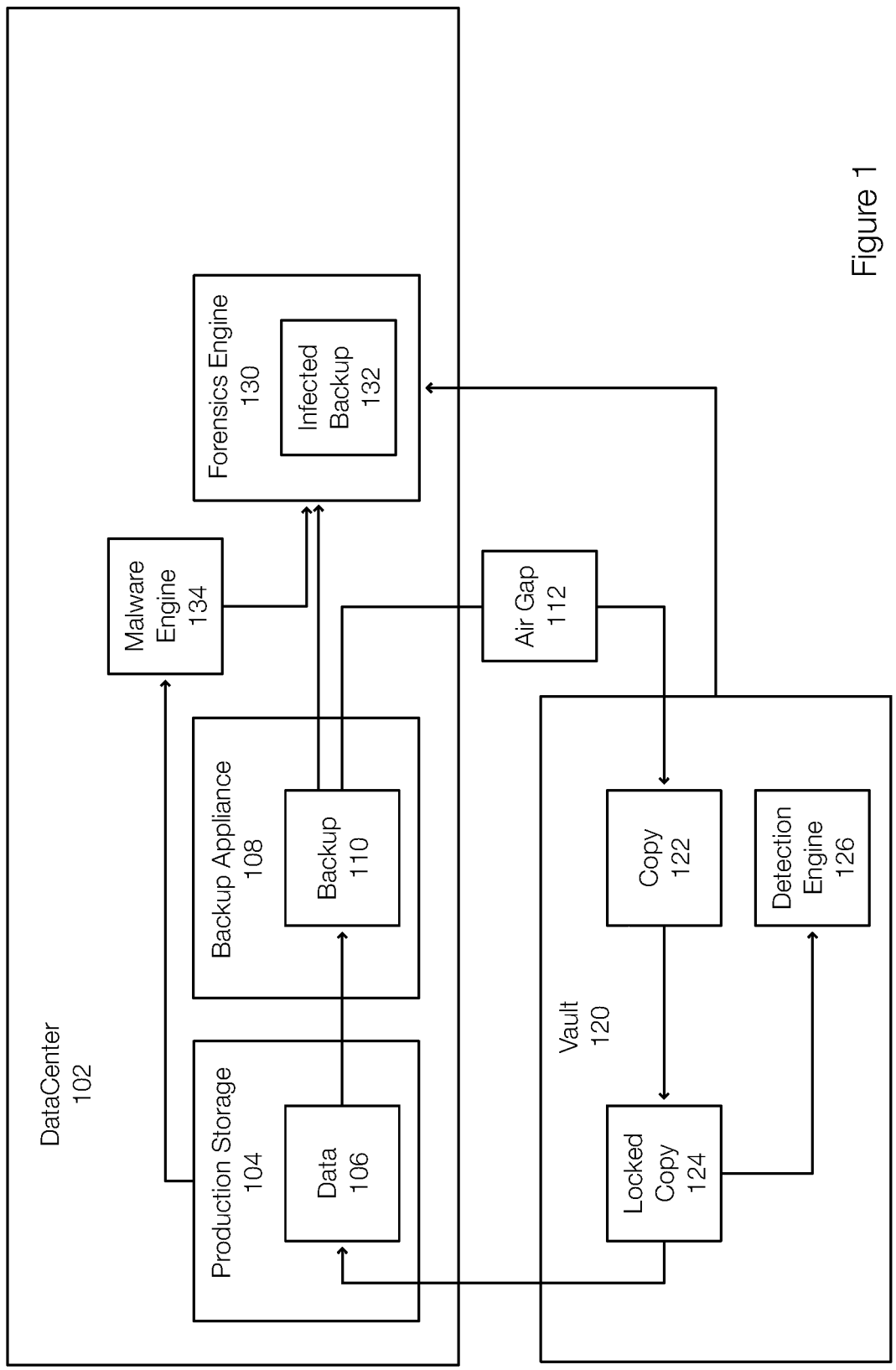
FIG. 1 discloses aspects of a forensic engine or kit configured to perform data protection operations including learning operations performed by a malware and responding to the malware.

Embodiments of the present invention generally relate to data protection systems and data protection operations. More particularly, at least some embodiments of the invention relate to systems, hardware, software, computer-readable media, and methods for responding to malware and other cyber-attacks.

In general, example embodiments of the invention relate to data protection operations including, but not limited to, data protection operations, backup operations, snapshot operations, restore/recover operations, point-in-time backup/recover operations, malware response operations, malware evaluation operations, or the like or combinations thereof.

The term malware, as used herein and by way of example, may refer to ransomware, viruses, rootkits, spyware, adware, trojans, worms, phishing attacks, or other unwanted software or cyber-attacks.

Embodiments of the invention relate to a forensic engine, or a forensics kit configured to evaluate and/or respond to malware. When malware is detected in a production system (or in a backup), the forensic engine may perform a snapshot or other backup of the production system. The snapshot, which includes the malware, is an infected snapshot and may be deployed to a forensics environment such that the forensic engine can research the malware and learn how the malware operates. The forensic engine allows the malware to operate in an observed manner such that operational characteristics of the malware can be learned. The operational characteristics may include determining how files are altered or affected (e.g., deleted, changed, encrypted, transmitted, read, moved), how and where data is sent by the malware, how the malware spreads, how the malware response to anti-malware software, how the malware tries to avoid detection, how the malware infects backups, which components of the production system the malware infects or alters, and the like or combination thereof.

Embodiments of the invention allow the forensic engine to learn these operational characteristics or other behavior. While learning the operational characteristics or after learning the operational characteristics, the forensic engine may be configured to operate in a proactive manner. For example, the forensic engine can trick or cause the malware to send a response malware back to the malware's source. The response malware may be able to mitigate, or reverse damage caused by the malware in the production system. For example, the malware may encrypt stolen data.

In one example, malware may be configured to transmit data from the infected system back to a malware host system. The malware may also receive communications from the malware host system. In the event that these communications are interrupted or are viewed as abnormal by the malware or the malware host system, the malware may be configured to self-destruct or perform other evasive action. If this occurs prior to learning the operational characteristics of the malware, the ability to combat, thwart, or respond to the malware may not be achieved.

Embodiments of the invention relate to a forensics kit or engine that may prepare a working scenario to be run on or in the context of a snapshot or point-in-time backup. Embodiments may operate in other working scenarios with other backup types. The working scenario or a portion thereof may be created in advance such that the snapshot taken by or for the forensic engine can operate in the working scenario. The working scenario may be prepared with false data and allows the malware to operate at least until the operational characteristics of the malware have been learned or identified. In one example, rather than allowing the malware to communicate with the malware host, the communication may be emulated by the forensic engine.

The working scenario allows the malware to communicate with the malware host system. By allowing the malware to communicate with the malware host system and/or allowing the malware host system to communicate with the malware, the malware continues to operate. In one example, the malware may be unaware that it has been detected. In other words, this allows the malware to be evaluated without the attacker being aware of the fact that the malware has been detected. This allows the operational characteristics of the malware to be learned. In addition, the working scenario can plant or place return malware that the malware will transmit back to the malware host system. For example, the malware may be embedded in data that the malware is expected to transmit to the malware host system. The return malware may be configured to mitigate damage caused by the malware. For example, the malware may encrypt data that has been transmitted to the malware host system. This, in effect, prevents the malware host from accessing the data.

FIG. 1 discloses aspects of a forensic engine configured to perform data protection operations including malware related operations. FIG. 1 illustrates a datacenter 102 that includes production storage 104, which stores production data 106. The datacenter 102 may also host applications associated with the data 106. The production data 106 may include data required or accessed by users, applications, or the like. The data 106 may include files, objects, blocks, a database, emails, images, videos, documents, spreadsheets, presentations, or the like or combination thereof.

Although FIG. 1 illustrates production storage 104 of a datacenter 102, the production storage 104 may be an on-premise storage system, an edge system storage, or the like or combination thereof. The production storage 104 may include storage devices such as hard disk drives.

A backup appliance 108 is configured to generate and store backups of the data 106 (and/or applications), represented as the backup 110. The backup 110 may be a full backup, a synthetic backup, incremental backups, snapshots, or the like. The backup appliance 108 may be a virtual appliance or a physical appliance.

More generally, the backup appliance 108 may protect data, applications, or the like. The backup appliance 108 may transmit the backup 110 to a vault 120, which may be protected by an air gap 112 controlled by the vault 120. This allows a copy 122 of the data 106 to be stored in the vault 120 only when a connection is available (e.g., the air gap 112 is configured to allow communication). After ingestion into the vault 120, the copy 122 is locked to generate a locked copy 124. The locked copy 124 is immutable in one example. The vault 120 may be created in the datacenter 102 or in another location that is remote from the data 106 and/or the backup appliance 108.

During a recovery operation, the data 106 may be recovered from the locked copy 124 (or other backup in the vault 120). In some examples, the data 106 may be recovered from the copy 122 if necessary. In one example, the backup 110 may be a namespace that is backed up to a namespace in the vault 120. The backup 110 may be transmitted to a namespace in the vault 120 as the copy 122. Next, the copy 122 may be copied to another namespace and retention locked, which results in the locked copy 124.

Once the locked copy 124 is generated and retention locked, the immutability is guaranteed in one example. For example, the locked copy 124 is secure from attack vectors that adversely impact backups because the vault 120 may not be accessible, due to the air gap 112, which is controlled from inside the vault 120 in one example.

The air gap 112 may not be required but provides a more secure backup environment. In one example, the vault 120 may be a target site (e.g., a cloud, edge, or on-premise site) that is not protected by an air gap but is configured to store backups received from the backup appliance 108. The vault 120 may be associated with a corresponding appliance that may be configured to store the backups in the target site and also perform restore or recover operations. In one example, the air gap 112 is not present and the value 120 may simply represent backup storage that stores backups received from the backup appliance 108.

The production storage 104 (or more generally the production system) may be associated with a malware engine 134. When the malware engine 134 detects malware in the production storage 104 or more generally in the production system (or in a backup), the malware engine 134 may trigger the forensic engine 130. The forensic engine 130 may be triggered in another manner or may include the malware engine 134.

When triggered, the forensic engine 130 may generate a snapshot (e.g., a point-in-time snapshot) or other backup of the production system, which is illustrated as an infected backup 132. The infected backup 132 may be taken from the data 106, may be a PiT copy or generated from the backup 110, or the like. In one example, the infected backup 132 is a most recent point-in-time backup. However, the infected backup 132 may represent different point in time and/or different backup types.

Figure 2:
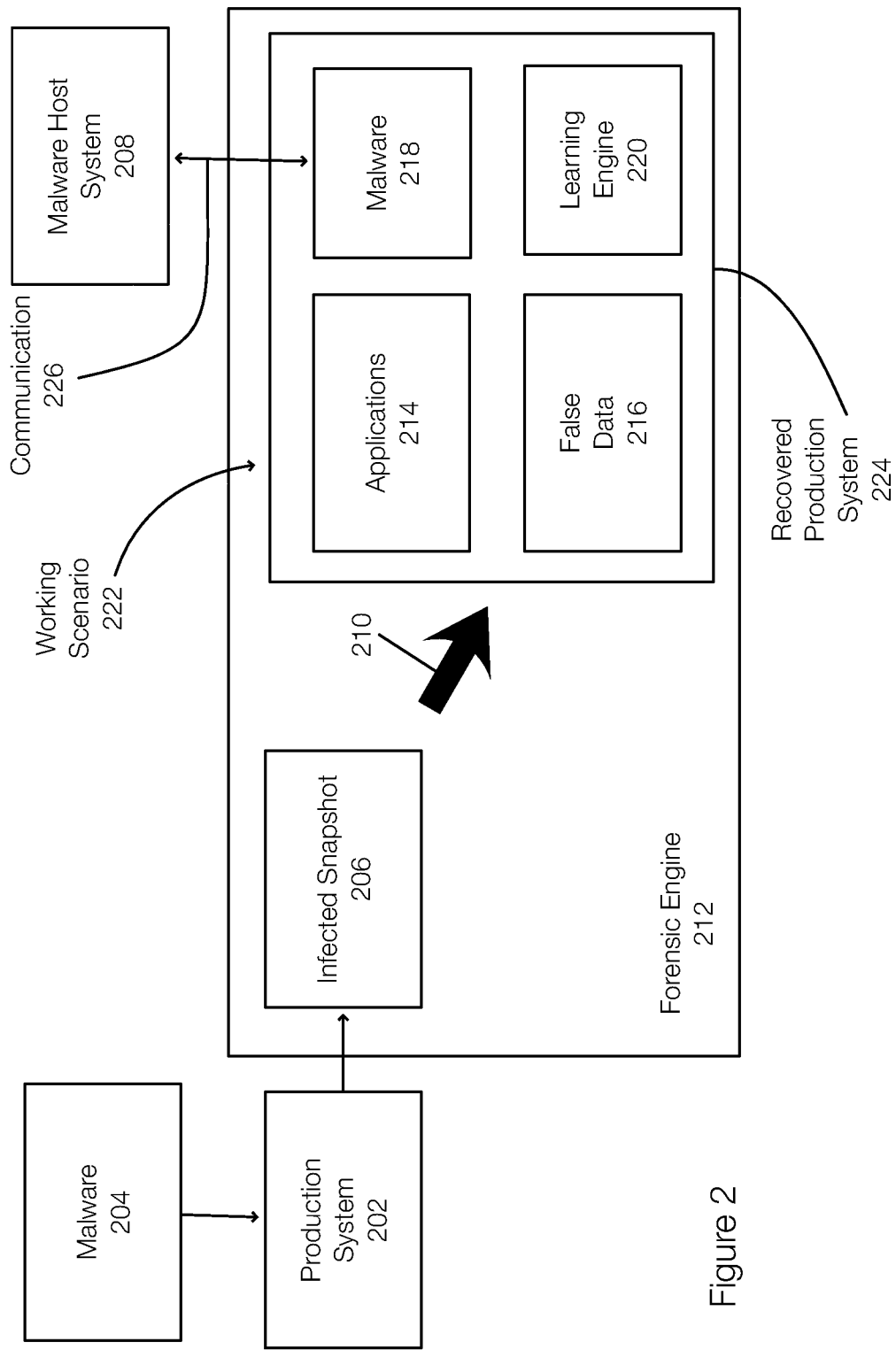
FIG. 2 discloses aspects of a forensic engine configured to perform data operations including malware response operations.

FIG. 2 discloses aspects of performing malware related operations and illustrates an example of a working scenario. In FIG. 2, malware 204 has infected a production system 202. This triggers a snapshot or backup operation by the forensic engine 212 (or the backup appliance), which generates an infected snapshot 206. The forensic engine 212 may deploy 210 the infected snapshot 206 to a working scenario 222, which may have been previously prepared, and which is an example of a forensic infrastructure. The working scenario 222 may be configured to appear as a real system and may operate as a real system. This allows the infected snapshot 206 or the recovered production system 224 in the working scenario 222, in one example, to operate as if it were a production system.

The working scenario 222, however, may not be an exact replica of the infected snapshot 206. In one example, the working scenario is prepared with false data 216. Thus, the infected snapshot 206 may be recovered as the recovered production system 224 that may include false data 216. The malware 204 is represented as the malware 218 in the recovered production system 224. Thus, the recovered production system 224, which is infected with the malware 218, is recovered to the working scenario 222 and includes applications 214, false data 216, and a learning engine 220. The learning engine 220 may be added by the forensic engine 212 (or is part of the forensic engine 212) or included in the working scenario 222. More specifically, the learning engine 220 may be deployed to the recovered production system 224 in the working scenario 222.

The learning engine 220 is configured to learn the operational characteristics of the malware 218. This may include monitoring and observing the operation of the malware 218. This allows the learning engine 220 to determine what files in the false data 216 are accessed by the malware 218, learn when the files in the false data 216 are accessed, learn functions performed by the malware 218, monitor communications with a malware host system 208, and the like. The learning engine 220 may learn how often the malware 218 acts, how the malware 218 replicates or spreads, and the like. The learning engine 220 may log actions performed by the malware 218 or the like. The insights learned by the learning engine 220 are collectively referred to as the operational characteristics of the malware 218.

In one example, the recovered production system 224 is configured to operate as if the malware 218 has not been detected. Thus, the recovered production system 224 is operated normally. This helps ensure that the malware 218 communicates with the malware host system 208 and/or ensures that the malware host system 208 communicates with the malware 218. This prevents the malware 218 from self-destructing or from being disabled due to perceived changes in the communication 226 between the malware host system 208 and the malware 218.

The output (e.g., the operational characteristics) of the learning engine 224 may be analyzed or used by the forensic engine 212. The output the forensic engine 212 to perform both reactive and proactive actions. For example, the forensic engine 212 may be able to react more quickly in the event that the malware 218 reoccurs. The forensic engine 212 may be able to prevent future infections of the malware 218. As previously stated, the false data 216 appears to be real, but does not prejudice the production system 202 in one example. Because the working scenario 222 is operating in a live manner, any data exported by the malware 218 is benign and non-damaging to the production system 202. Because the communication 226 is also uninterrupted, the malware host system 208 believes that the malware 218 has not been detected. This allows the learning engine 220 to learn the operational characteristics of the malware 218 and/or the malware host system 208.

When preparing a working scenario or when recovering from an infected backup, the recovery system may be configured to recover fake or false data. The malware protection operations may be configured to prevent the malware from discovering it has been detected. This may include recovering false data as part of the recovery operation rather than recovering into a system prepared with false data.

Figure 3:
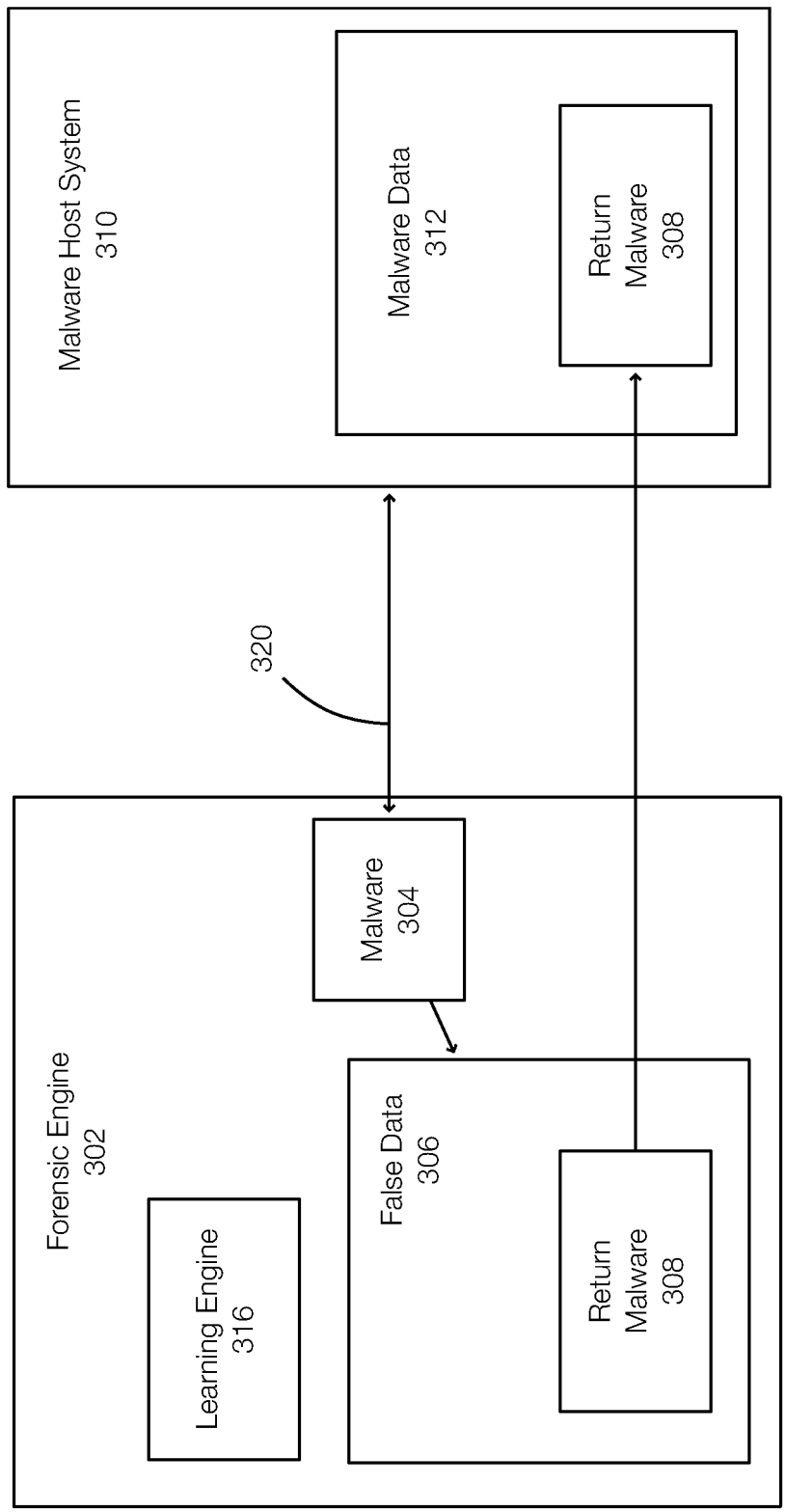
FIG. 3 discloses aspects of a forensics operation configured to perform a malware response operations.

FIG. 3 illustrates an example of a malware response operation. In FIG. 3, forensic engine 302 may be operating a recovered production system that has been recovered from an infected backup with false data 306. In this example, the learning engine 316 is learning or has learned the operational characteristics of the malware 304.

The forensic engine 302 allows the malware 304 and the malware host system 310 to communicate 320. For example, the malware 304 may only operate normally if the malware can (i) receive communications from the malware host system 310 and/or (ii) to transmit data/communications to the malware hose system 310. Some malware may self-destruct if communications 320 are not as expected.

Maintaining the communication 320 allows the learning engine 316 to learn the operational characteristics of the malware 304 without alerting the malware 304 or the malware host system 310 that the malware has been detected. Using false data 306 ensures that the production system, privacy concerns, or the like are not compromised.

Once the learning engine 316 has learned the operational characteristics or after a certain amount of time, the learning engine 316 (or more generally the forensic engine 302) may place or plant return malware 308 in the false data 306. In another example, the return malware 308 may already exist in the false data 306 of the working scenario. During normal operation of the malware 304, the return malware 308 will be transmitted to the malware host system 310 and be stored in the malware data 312.

In one example, this may allow the return malware 308 to encrypt data that was stolen at the malware host system 310. This mitigates damage because the stolen data cannot be accessed by the malware host system 310. The return malware 308 may be configured to perform other operations as discussed herein. More specifically, based on the operational characteristics, the return malware 308 is placed in the false data 306 such that the malware 304 operates to transmit the return malware 308 back to the malware host system 310. Thus, even if the malware 304 is transmitting some of the data 306, which may be fake or false, the malware 304 is also tricked or caused to transmit the return malware 308 back to the malware host system 310.

The malware data 312 at the malware host system 310 may include data from the data 306. However, the forensic engine 302 has been able to place the return malware 308 at the malware host system 310 such that the malware data 312 is infected. More specifically, the malware 304 also transmits the return malware 308 to the malware host system 310, which then runs as return malware 308 on the malware host system 310. The return malware 308 may be the same or different from the malware 304.

The return malware 308 may be configured to search the malware host system 310 for information or data (e.g., cryptographic keys) that may allow encrypted data to be decrypted. The return malware 308 may act on the malware host system 310, for example, by encrypting the malware host system 310. The return malware 308 may interfere with other instances of the malware 304 instantiated in other systems. The return malware 308 may attempt to collect information from the malware host system 310 to learn who operates the malware host system 310, how the malware system operates 310, to identify partners or participants in the distribution of the malware 304, or the like. This may be enabled as a law enforcement tool in responding to malware attacks. The return malware 308 may not cause any actual damage to the malware host system 310 but may be configured to simply learn information that may aid in preventing/removing/healing current and/or future attacks and/or information that may be valuable to law enforcement or other investigators.

Figure 4:
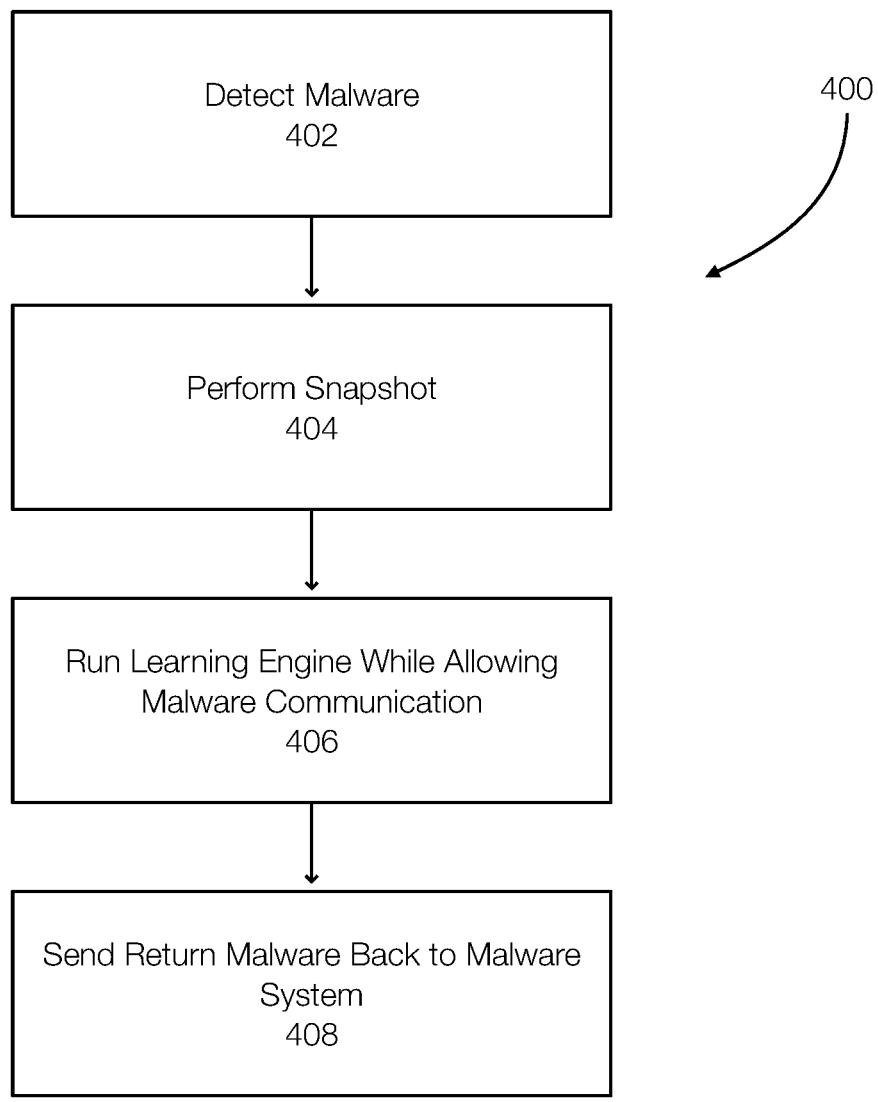
FIG. 4 discloses aspects of a malware response operation.

FIG. 4 discloses aspects of performing malware related operations. In the method 400, malware may be detected 402 in a production system or in a backup. After the malware is detected, a snapshot is performed 404 and delivered to a forensic engine. The forensic engine may generate the snapshot of the production system or generate a copy of an infected backup.

Once the snapshot, which is infected, is taken (or a copy of an infected backup), the snapshot is recovered to a forensic infrastructure allowed to execute in a forensic infrastructure as if it were a production system. This working scenario is controlled and may be prepared in advance. Thus, recovering or restoring the snapshot to the working scenario may be different from a typical restore operation. For example, data may not be recovered because the working scenario already includes false data. Alternatively, the recovery ensures that the malware is present an active in the working scenario.

A learning engine is deployed and runs 406 to learn operational characteristics of the malware while allowing the malware to transmit and receive data/communications. Allowing the malware to transmit/receive communications, data, or the like may prevent the malware from knowing it has been discovered and prevent the malware from self-destructing or taking other actions that would impede the ability to learn the operation characteristics of the malware. In some examples, these transmissions may be emulated. In effect, the working scenario or environment is a live environment at least from the perspective of the malware. If necessary, the working scenario may also simulate reads/writes to the data such that the malware, if monitoring the operations of the working scenario, does not detect that the working scenario is not truly live. This allows the learning engine to learn how/when the malware communicates, reads data, encrypts data, replicates, hides, accesses data, copies data, moves data, infects operating systems, monitors communications, or the like. Running the learning engine, after the operational characteristics are learned, includes planting or placing return malware in the data of the recovered production system.

For example, the return malware may be placed by a write operation that may be interpreted by the malware as new data to be transmitted back to the malware host system. The malware may be placed among the data, may have a non-threatening file extension, or the like.

More specifically, because the learning engine understands the operational characteristics of the malware, the learning engine is able to plant or place the return malware in a manner that, in effect, tricks the malware into sending the return malware back to the malware host system. Thus, the learning engine, in effect, sends 408 the return malware back to the malware host system. The return malware is then executed on the malware system. The functions performed by the return malware depend on how the return malware is configured.

Figure 5:
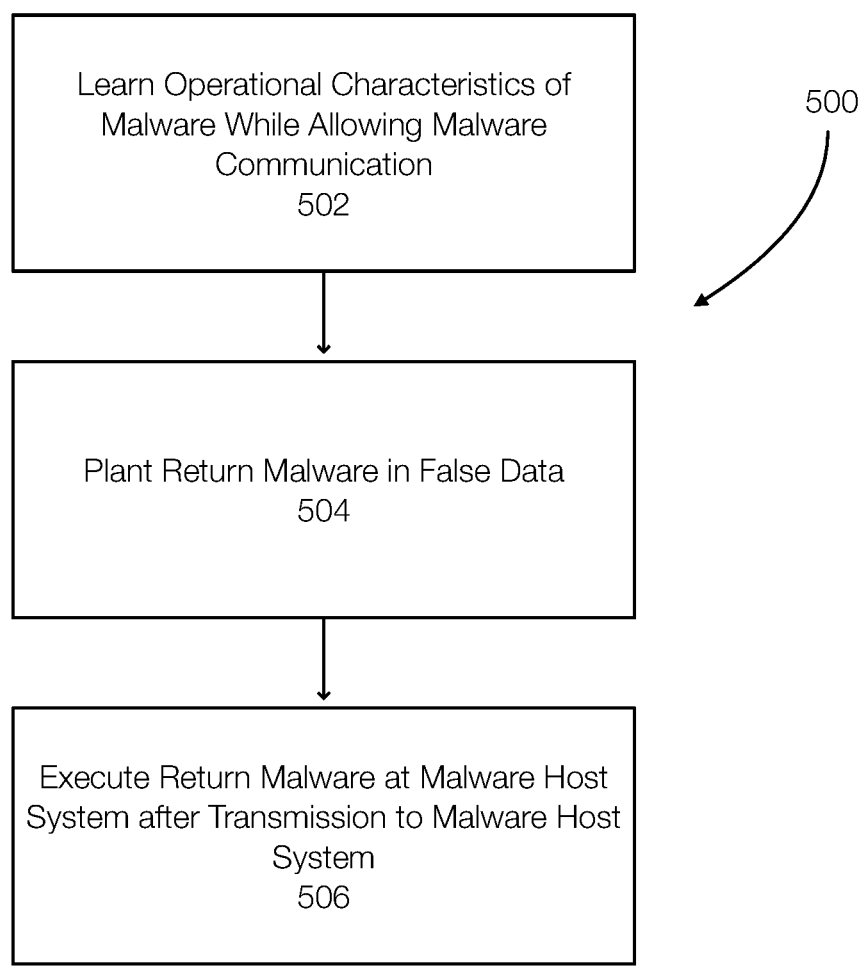
FIG. 5 discloses additional aspects of malware response operations.

FIG. 5 discloses aspects of malware response operations. In the method 500, operational characteristics of malware may be learned 502, for example, by operating an infected system in a forensic infrastructure, which may include a previously prepared working scenario. More specifically, the forensic engine may be configured to learn the operational characteristics of multiple malware in this manner. The operational characteristics can be aggregated to learn broader malware trends or operations. This may provide insight that may apply generally to known and unknown malware.

The operational characteristics may allow the forensic engine to plant or place 504 return malware in a production system that has not yet been attacked. In the event of an attack, for example for attacks that are undetected, the previously planted return malware may be returned 506 to the malware host system and executed even if the specific operational characteristics of the malware may not be known. The operational characteristics learned from multiple malware improves the likelihood that the malware will transmit the return malware to the malware host system.

In one example, embodiments of the invention allow a working scenario to be run on a point-in-time or other backup to make the attacker think that the malware has not been detected at least until the research on the malware is completed by the learning engine.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, malware detection operations, malware response operations, malware deployment operations, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Power-Protect Cyber Recovery and associated data protection software, and storage environments such as the Dell-EMC DataDomain or PowerProtect storage environments. In general, however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

It is noted that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method comprising: detecting malware in a production system, generating a backup of the production system by a forensic engine, recovering the backup to a forensic infrastructure that includes a as a recovered system, while operating the recovered system, learning operational characteristics of the malware while allowing the malware to transmit communications to and/or receive communications from a malware host system, placing return malware into the data of the recovered system based on the operational characteristics, wherein the return malware is configured to be transmitted to the malware host system by the malware, and executing the return malware in the malware host system.

Embodiment 2. The method of embodiment 1, wherein the malware views the return malware as data of the recovered system.

Embodiment 3. The method of embodiment 1 and/or 2, wherein the operational characteristics include functions performed by the malware, timing of the functions, communications performed by the malware, data affected by the malware, evasion functions, or combination thereof.

Embodiment 4. The method of embodiment 1, 2, and/or 3, further comprising configuring the return malware such that the malware transmits the return malware back to the malware host system.

Embodiment 5. The method of embodiment 1, 2, 3, and/or 4, wherein the recovered system comprises a working scenario that is prepared with false data.

Embodiment 6. The method of embodiment 1, 2, 3, 4, and/or 5, wherein the return malware is configured to mitigate or reverse damage caused by the malware.

Embodiment 7. The method of embodiment 1, 2, 3, 4, 5, and/or 6, further comprising replacing data in the recovered system with false data and allowing the recovered system to operate in a live and connected manner.

Embodiment 8. The method of embodiment 1, 2, 3, 4, 5, 6, and/or 7, wherein the recovered system is configured to operate normally.

Embodiment 9. A method comprising: learning operational characteristics of multiple malware while allowing the multiple malware to communicate with corresponding malware host systems, placing a return malware in a production system based on the operational characteristics of the multiple malware to cause, in the event of an attack by malware, the malware to transmit the return malware to a malware host system, and executing the return malware at the malware host system Embodiment 10. The method of embodiment 9, wherein the return malware is transmitted prior to detecting the malware at the production system.

Embodiment 11. The method of embodiment 9 and/or 10, further comprising altering the return malware and/or a manner in which the return malware is placed as additional operational characteristics become available.

Embodiment 12. The method of embodiment 9, 10, and/or 11, further comprising detecting the malware and generating a snapshot of a production system that includes the malware, wherein the snapshot is recovered and run in a working scenario to learn the operational characteristics of the malware.

Embodiment 13. A method for performing any of the operations, methods, or processes, or any portion of any of these, or any combination thereof disclosed herein.

Embodiment 14. A non-transitory storage medium having stored therein instructions that are executable by one or more hardware processors to perform operations comprising the operations of any one or more of embodiments 1-13.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, engine, agent, or the like may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
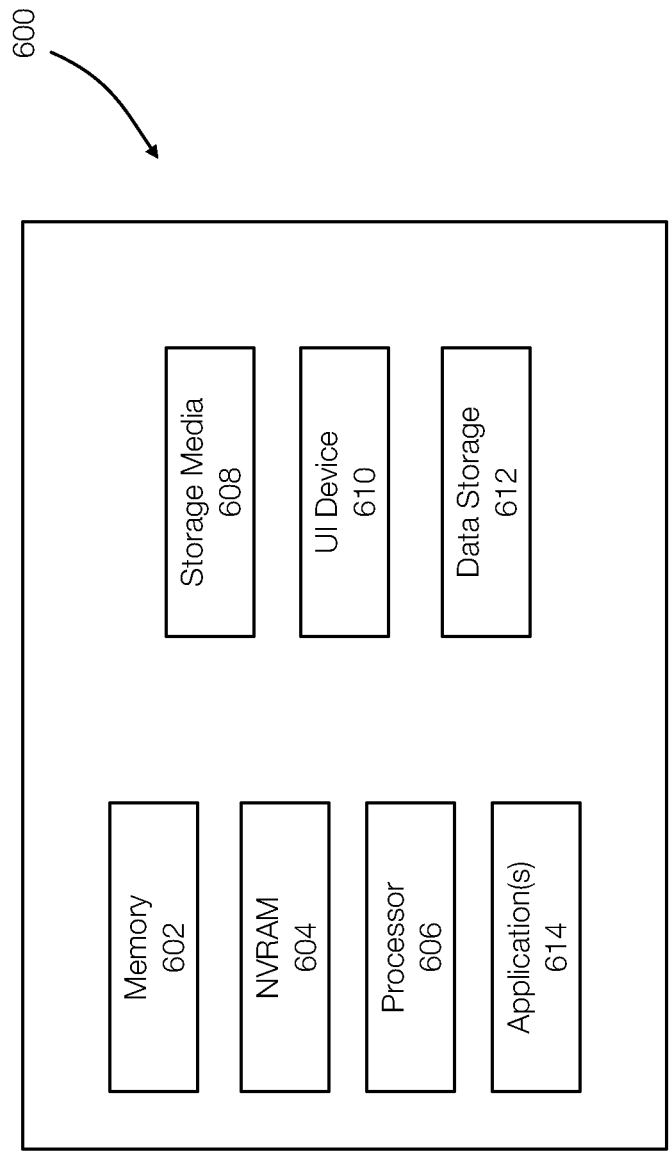
FIG. 6 discloses aspects of a computing device, system, or entity.

With reference briefly now to FIG. 6, any one or more of the entities disclosed, or implied, by the Figures and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 6.

In the example of FIG. 6, the physical computing device 600 includes a memory 602 which may include one, some, or all, of random access memory (RAM), non-volatile memory (NVM) 604 such as NVRAM for example, read-only memory (ROM), and persistent memory, one or more hardware processors 606, non-transitory storage media 608, UI device 610, and data storage 612. One or more of the memory components 602 of the physical computing device 600 may take the form of solid-state device (SSD) storage. As well, one or more applications 614 may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   detecting malware in a production system;
   generating a backup of the production system by a forensic engine that includes the malware;
   recovering the backup that includes the malware to a forensic infrastructure that includes a recovered system;
   while operating the recovered system that includes the malware in the forensic infrastructure, learning operational characteristics of the malware while allowing the malware to transmit communications to and/or receive communications from a malware host system;
   placing return malware into the data of the recovered system as new data based on the operational characteristics, wherein the return malware is configured to cause the malware to be transmitted to the malware host system, wherein the return malware is executed in the malware host system.

2. The method of claim 1, wherein the malware views the return malware as data of the recovered system.

3. The method of claim 1, wherein the operational characteristics include functions performed by the malware, timing of the functions, communications performed by the malware, data affected by the malware, evasion functions, or combination thereof.

4. The method of claim 1, further comprising configuring the return malware such that the malware transmits the return malware back to the malware host system.

5. The method of claim 1, wherein the recovered system comprises a working scenario that is prepared with false data.

6. The method of claim 1, wherein the return malware is configured to mitigate or reverse damage caused by the malware.

7. The method of claim 1, further comprising replacing data in the recovered system with false data and allowing the recovered system to operate in a live and connected manner.

8. The method of claim 7, wherein the recovered system is configured to operate normally.

9. A non-transitory storage medium having stored therein instructions that are executable by one or more hardware processors to perform operations comprising:
   detecting malware in a production system;

generating a backup of the production system by a forensic engine that includes the malware;
recovering the backup that includes the malware to a forensic infrastructure that includes a recovered system;
while operating the recovered system that includes the malware in the forensic infrastructure, learning operational characteristics of the malware while allowing the malware to transmit communications to and/or receive communications from a malware host system;
placing return malware into the data of the recovered system as new data based on the operational characteristics, wherein the return malware is configured to cause the malware to be transmitted to the malware host system, wherein the return malware is executed in the malware host system.

10. The non-transitory storage medium of claim 9, wherein the malware views the return malware as data of the recovered system.

11. The non-transitory storage medium of claim 9, wherein the operational characteristics include functions performed by the malware, timing of the functions, communications performed by the malware, data affected by the malware, evasion functions, or combination thereof.

12. The non-transitory storage medium of claim 9, further comprising configuring the return malware such that the malware transmits the return malware back to the malware host system.

13. The non-transitory storage medium of claim 9, wherein the recovered system comprises a working scenario that is prepared with false data.

14. The non-transitory storage medium of claim 9, wherein the return malware is configured to mitigate or reverse damage caused by the malware.

15. The non-transitory storage medium of claim 9, further comprising replacing data in the recovered system with false data and allowing the recovered system to operate in a live and connected manner.

16. The non-transitory storage medium of claim 15, wherein the recovered system is configured to operate normally.

17. A method comprising:
learning operational characteristics of multiple malware while allowing the multiple malware to communicate with corresponding malware host systems; and
placing a return malware in a production system based on the operational characteristics of the multiple malware to cause, in the event of an attack by malware on the production system, the malware to transmit the return malware to a malware host system, wherein the return malware is executed at the malware host system and is placed in the production system prior to the attack.

18. The method of claim 17, wherein the return malware is transmitted prior to detecting the malware at the production system.

19. The method of claim 17, further comprising altering the return malware and/or a manner in which the return malware is placed as additional operational characteristics become available.

20. The method of claim 17, further comprising detecting the malware and generating a snapshot of a production system that includes the malware, wherein the snapshot is recovered and run in a working scenario to learn the operational characteristics of the malware.

* * * * *